(No Model.)
G. W. KNAPP & N. G. NUMSEN.
SOLDERING IRON.
No. 263,413. Patented Aug. 29, 1882.
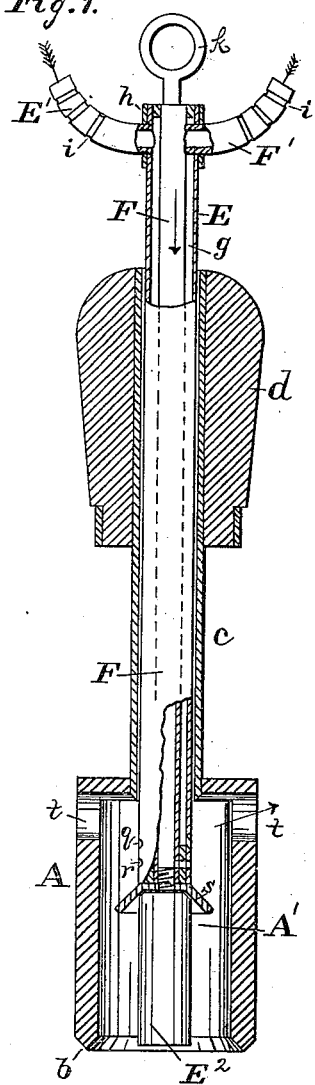
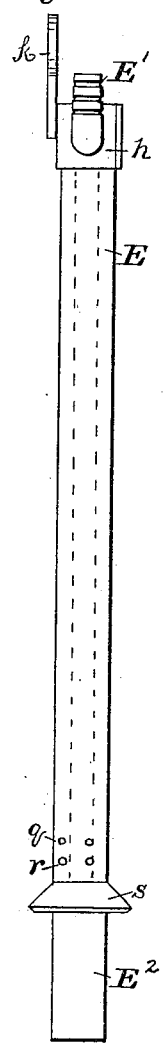
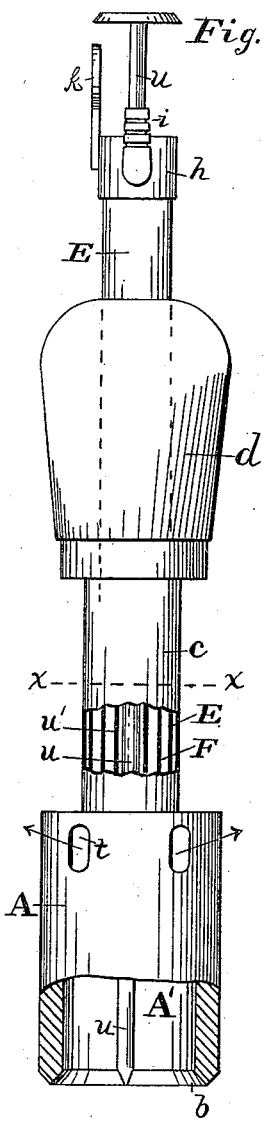
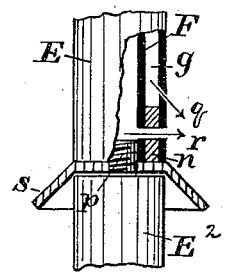
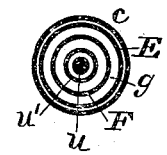
Witnesses:
A. C. Eader
John E. Morris.
Inventors:
George W. Knapp
Nathaniel G. Numsen
By Chas. B. Mann
Attorney

UNITED STATES PATENT OFFICE.

GEORGE W. KNAPP AND NATHANIEL G. NUMSEN, OF BALTIMORE, MD.

SOLDERING-IRON.

SPECIFICATION forming part of Letters Patent No. 263,413, dated August 29, 1882.

Application filed July 13, 1882. (No model.)

*To all whom it may concern:*

Be it known that we, GEORGE W. KNAPP and NATHANIEL G. NUMSEN, citizens of the United States of America, residing at Baltimore, in the State of Maryland, have invented certain new and useful Improvements in Soldering-Irons, of which the following is a specification, reference being had therein to the accompanying drawings.

Our invention relates to an improvement in soldering-irons, and has for its object to provide for more satisfactorily burning gas and air for heating the iron.

The invention will first be described, and then designated in the claims.

In the drawings hereto annexed, Figure 1 is a longitudinal section of a can-capping iron. Fig. 2 is a view separately of the combined air and gas tubes and cap-holding rod. Fig. 3 is a side view of a capping-iron intended for the use of a separate cap-holding rod. Fig. 4 shows the position of the outlets and the direction of their bore. Fig. 5 is a cross-section of shank and tubes at $x$ $x$, Fig. 3.

The iron shown in the present instance is of the kind usually employed for soldering the caps on fruit and oyster cans; but a part of our invention may be used in connection with the ordinarily-shaped iron generally employed by tinsmiths.

The letter A designates the iron, which is cylindrical and has a central chamber, A'.

$b$ is the rim or annular face which applies the solder about the cap, $c$ the shank, and $d$ the handle. The shank $c$, which connects the handle to the iron, is a tube open at both ends.

The letter E designates a tube, inside of which is a smaller tube, F, a space, $g$, existing around the small tube and between it and the outer large tube. The upper ends of these tubes are connected by a head-piece, $h$, and a curved tube, E', is attached on one side of the head and connects with the space $g$ in the outer tube, while another curved tube, F', is attached on the diametrically-opposite side of the head and connects with the inner tube, F. Both of the tubes attached to the head curve upward, or both in the same direction away from the soldering-iron, and each is provided on its exterior with annular grooves to facilitate the attachment on the curved tube of a flexible tube, which it is deemed unnecessary to show. It will be understood that one of the curved tubes is for the reception of a supply of air impelled by pressure, as from a blower or other means of forcing air, and the other is for the reception of a supply of gas. The curved tubes are directed upward, as shown, in order that the aforesaid flexible tubes (not shown) may be supported overhead and hang directly down to connect therewith. A ring, $k$, is attached to the head-piece at one side and between the two curved tubes, and affords means by which to hang the iron on a hook, which in practice should be at an elevation, but in convenient position by the operator. The tubes E and F extend loosely through the handle and through the tubular shank $c$, and their lower ends project below into the chamber A' of the iron. The lower ends of the tubes E and F are connected by a ferrule, $n$, forced into the space $g$ between them. The end of the inner tube, F, is plugged or closed by the screw-threaded end $p$ of the cap-holding rod E², which is practically a continuation of the tube E. Above the point of joinder of the cap-holding rod holes $q$ are made and enter in a slanting direction into the side of the outer tube, as outlets for the intervening space $g$, and holes $r$ are bored through both tubes and the ferrule and enter in a direction at right angles with the tube and serve as outlets for the inner tube. The holes $q$ and $r$ have such position with respect to and are so distanced from each other and the direction in which each enters so varies—that is, while one enters at right angles to the tube the other enters in a slanting direction—that a current issuing from one will be intersected by any current which may issue from the other.

If the inner tube be employed as a passage for gas and the intervening space $g$ as a passage for air, the operation will be as follows: As the gas and air are conveyed separately from the curved tubes above the handle by independent passages to the point within the chamber of the soldering-iron where it is desired combustion shall take place, the gas may be under a certain pressure while the air is under a different and greater pressure—a thing that is of importance in practice. The gas and air issue from their respective outlets $r$ and $q$. The gas is first ignited, and the current of air intersecting the flame at or near the point of combustion so intensifies the latter that the non-luminous blow-pipe flame is produced, and with the additional result that although the pressure of air may vary and may sometimes be excessive the non-luminous blow-pipe flame will steadily continue to burn and will not be extinguished by the said excessive air-pressure.

We are aware that soldering-irons have heretofore been constructed for burning gas and air, and that in such a tube has been employed for the passage of gas and a space around the tube for the passage of air, or vice versa, the gas and air uniting before combustion takes place; but in all such the trouble has been to obtain the desired intensity of heat, for upon an increased supply of air being forced by greater pressure the flame is liable to go out, apparently, because the sudden excessive pressure of air temporarily cuts off the supply of gas.

A concaved disk-plate, $s$, is secured to the end of the two tubes by the screw $p$ of the cap-holding rod, which also serves to close the end of the inner tube. This disk serves to prevent the flame from directing downward.

The outlets $t$ in that part of the iron which forms the wall of the chamber permit the escape of the products of combustion.

The tool is employed as follows: The iron, being heated sufficiently for soldering, is placed over the cap which is upon the can. As the tube E, which contains the passages for conveying the air and gas to the outlets, is continued, or has the rod $E^2$ below the outlets, the end of the said rod $E^2$ rests upon the cap and retains it in position. The cylindrical iron is rotated back and forth about the stationary tubes and solders the cap.

We are aware that a rod to hold the cap while an iron rotates about the rod is not new; but we believe it is new to combine the passages for air and gas with the cap-holding rod, and also new to have the tube which contains the air and gas passages extend loosely through the shank and handle to the iron and remain fixed or stationary, while the iron, its shank, and handle rotates about the tube, whereby the flexible tubes, which are attached to the curved tubes at the upper end, may remain stationary, and all twisting thereof is avoided.

In Fig. 3 a separate rod, $u$, is shown, which extends vertically from a point above the upper end of the tubes through the handle, shank, and iron. For this purpose a third tube, $u'$, is necessary—that is, a tube inside of the inner tube, F—through which third tube the separate cap-holding rod $u$ may move freely, which arrangement will be readily understood by any skilled mechanic. This modification shows that our arrangement of the air and gas passages and their outlets by which to produce intersecting currents is not necessarily connected with the use of the lower end of the tube as a cap-holding rod.

Having described our invention, we claim and desire to secure by Letters Patent of the United States—

1. In a soldering-iron for capping cans, a cap-holding rod having gas and air passages extending therethrough, as set forth.

2. In a soldering-iron for capping cans, the combination of an iron having a central chamber and a tubular shank and handle and a tube which passes loosely through the tubular shank and handle and contains separate air and gas passages, whereby while the iron rotates the gas and air supply tubes may remain stationary, as set forth.

3. A soldering-iron having a chamber, A', and air and gas tubes E F, whose ends enter the chamber, the one being within the other, leaving a space between, and at the end the said space and the inner tube being closed, and provided on the side with an outlet, $r$, which enters to the inner tube, and an outlet, $q$, which enters to the space, said outlets having such position with respect to each other and the one entering in a direction which so varies from that at which the other enters that a current issuing from one will intersect a current issuing from the other, as and for the purpose set forth.

4. In a soldering-iron for capping cans, the combination of an iron having a central chamber, a tube containing separate air and gas passages and provided with outlets opening into the chamber, and a disk-plate, $s$, attached to the tube below the outlets, as and for the purpose set forth.

5. A soldering-iron having a chamber, A', and air and gas tubes E F, whose lower ends enter the chamber and whose upper ends are connected by a head-piece, $h$, provided on each of two sides with an upward-curved tube, as and for the purpose set forth.

In testimony whereof we affix our signatures in presence of two witnesses.

GEORGE W. KNAPP.
NATHANIEL G. NUMSEN.

Witnesses:
  JNO. T. MADDOX,
  JOHN E. MORRIS.